(12) United States Patent
Davis et al.

(10) Patent No.: US 11,443,109 B2
(45) Date of Patent: *Sep. 13, 2022

(54) INTERACTIVE DATA ENTRY VALIDATION AND PROBLEM CORRECTION IN A TABLE COMPONENT IN A SPREADSHEET DRIVEN BY A WEB SERVICE

(71) Applicant: Oracle International Corporation, Redwood Shores, CA (US)

(72) Inventors: Edmund A. Davis, San Mateo, CA (US); Shaun Logan, Melrose, MA (US); Brian Rowles, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,720

(22) Filed: Jun. 30, 2021

(65) Prior Publication Data

US 2021/0326520 A1 Oct. 21, 2021

Related U.S. Application Data

(63) Continuation of application No. 16/145,051, filed on Sep. 27, 2018, now Pat. No. 11,080,476.

(60) Provisional application No. 62/565,069, filed on Sep. 28, 2017.

(51) Int. Cl.
| | |
|---|---|
| G06F 16/00 | (2019.01) |
| G06F 40/18 | (2020.01) |
| G06F 16/907 | (2019.01) |
| G06F 16/958 | (2019.01) |

(52) U.S. Cl.
CPC ............ *G06F 40/18* (2020.01); *G06F 16/907* (2019.01); *G06F 16/958* (2019.01)

(58) Field of Classification Search
None
See application file for complete search history.

(56) References Cited

U.S. PATENT DOCUMENTS

| | | | | |
|---|---|---|---|---|
| 7,287,227 | B2 * | 10/2007 | Ries | G06F 16/958 715/744 |
| 9,524,287 | B2 | 12/2016 | Davis | |
| 9,619,453 | B2 | 4/2017 | Logan | |
| 9,740,676 | B2 | 8/2017 | Logan | |
| 9,948,700 | B2 | 4/2018 | Rowles | |
| 10,073,604 | B2 * | 9/2018 | Yu | G06F 9/451 |
| 10,248,634 | B2 | 4/2019 | Davis | |
| 10,361,944 | B2 | 7/2019 | Chavda | |
| 10,445,675 | B2 * | 10/2019 | Sallakonda | G06Q 10/10 |
| 10,817,662 | B2 * | 10/2020 | Yawn | G06F 40/186 |
| 2004/0139111 | A1 | 7/2004 | Schoettger | |

(Continued)

*Primary Examiner* — Maikhanh Nguyen
(74) *Attorney, Agent, or Firm* — Trellis IP Law Group, PC

(57) ABSTRACT

Implementations generally relate to a spreadsheet add-in that provides data entry validation. As described in more detail herein, the spreadsheet add-in integrates a spreadsheet-based table component with a remote web service. The spreadsheet add-in uses web service metadata to validate data that a user enters into the spreadsheet. The spreadsheet add-in provides immediate feedback on errors in an interactive fashion for the user. Furthermore, during a data upload process, any errors that are reported by the web service are displayed in context such that the user may quickly affect corrections.

20 Claims, 9 Drawing Sheets

(56) References Cited

U.S. PATENT DOCUMENTS

| | | | |
|---|---|---|---|
| 2004/0217985 A9* | 11/2004 | Ries | G06F 40/166 |
| | | | 715/740 |
| 2008/0016041 A1 | 1/2008 | Frost | |
| 2012/0191732 A1 | 7/2012 | George | |
| 2013/0159832 A1 | 6/2013 | Ingargiola | |
| 2013/0198595 A1 | 8/2013 | Waldman | |
| 2014/0351686 A1* | 11/2014 | Yawn | G06F 40/186 |
| | | | 715/230 |
| 2015/0089340 A1 | 3/2015 | Logan | |
| 2015/0089342 A1 | 3/2015 | Davis | |
| 2015/0089351 A1 | 3/2015 | Logan | |
| 2015/0149876 A1 | 5/2015 | Davis | |
| 2015/0331596 A1* | 11/2015 | Yu | G06F 16/2428 |
| | | | 715/762 |
| 2016/0004668 A1 | 1/2016 | Rowles | |
| 2016/0085793 A1 | 3/2016 | Davis | |
| 2016/0292206 A1 | 10/2016 | Ruiz Velazquez | |
| 2016/0299936 A1 | 10/2016 | Chavda | |

* cited by examiner

INTERACTIVE DATA ENTRY VALIDATION AND PROBLEM CORRECTION IN A TABLE COMPONENT IN A SPREADSHEET DRIVEN BY A WEB SERVICE

CROSS REFERENCES TO RELATED APPLICATIONS

This application is a continuation of U.S. patent application Ser. No. 16/145,051, entitled INTERACTIVE DATA ENTRY VALIDATION AND PROBLEM CORRECTION IN A TABLE COMPONENT IN A SPREADSHEET DRIVEN BY A WEB SERVICE, filed on Sep. 27, 2018 which claims the benefit of U.S. Provisional Patent Application Ser. No. 62/565,069, entitled INTERACTIVE DATA ENTRY VALIDATION AND PROBLEM CORRECTION IN A TABLE COMPONENT IN A SPREADSHEET DRIVEN BY A WEB SERVICE, filed on Sep. 28, 2017, which are hereby incorporated by reference as if set forth in full in this application for all purposes.

BACKGROUND

Business users typically want to access and edit their business data using a spreadsheet. Conventional spreadsheet software may offer the ability to retrieve data from a web service. However, if a business user wants to make changes to the spreadsheet, extensive and highly-skilled programming is required to transmit the changes back to the web service. Similarly, conventional spreadsheet software typically does not provide interactive data entry validation or error correction in connection with web services.

SUMMARY

Implementations generally relate to a spreadsheet add-in that provides data entry validation using a web service. The spreadsheet add-in integrates a spreadsheet-based table component with a remote web service. The spreadsheet add-in uses web service metadata to validate data that a user enters into the spreadsheet. The spreadsheet add-in provides immediate feedback on errors in an interactive fashion for the user. Furthermore, during a data upload process, any errors that are reported by the web service are displayed in context such that the user may quickly affect corrections.

A further understanding of the nature and the advantages of particular embodiments disclosed herein may be realized by reference of the remaining portions of the specification and the attached drawings.

BRIEF DESCRIPTION OF THE DRAWINGS

FIG. 7 illustrates example portion of a spreadsheet 700, according to some implementations.

DETAILED DESCRIPTION OF EMBODIMENTS

Figure 1:
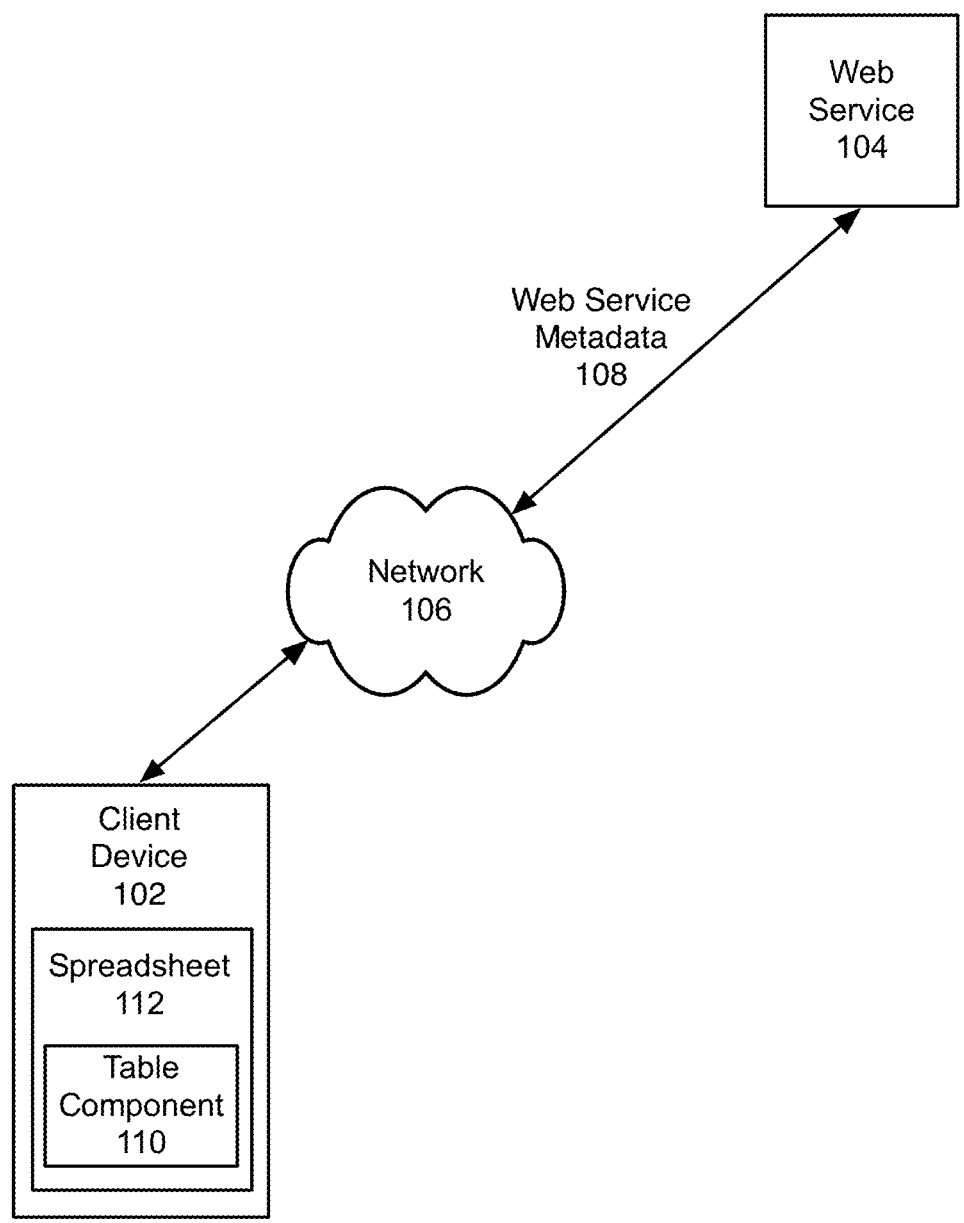
FIG. 1 illustrates a block diagram of an example application environment, which may be used for implementations described herein.

Implementations generally relate to a spreadsheet add-in that provides data entry validation. As described in more detail herein, the spreadsheet add-in integrates a spreadsheet-based table component with a remote web service. The spreadsheet add-in uses web service metadata to validate data that a user enters into the spreadsheet. The spreadsheet add-in provides immediate feedback on errors in an interactive fashion for the user. Furthermore, during a data upload process, any errors that are reported by the web service are displayed in context such that the user may quickly affect corrections.

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates a block diagram of an example application environment 100, which may be used for implementations described herein. Shown is a client device 102 and a web service 104, and client device 102 and web service 104 may communicate with each other via a network 106. In various implementations, client device 102 may access services and data directly from web service 104. Example implementations associated with application environment 100 are described in more detail herein.

Figure 2:
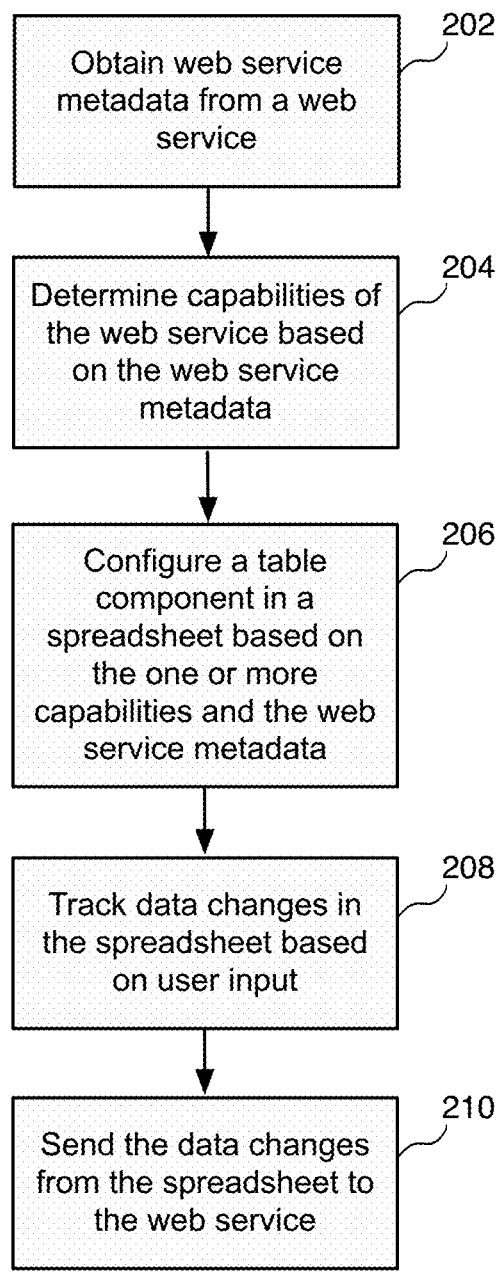
FIG. 2 illustrates an example flow diagram for editing spreadsheets, according to some implementations.

FIG. 2 illustrates an example flow diagram for editing a spreadsheet, according to some implementations. As described in more detail herein, implementations enable users with no previous programming experience to rapidly integrate spreadsheets with web applications in order to retrieve, analyze, and edit data. Implementations enable users to create and use ad-hoc graphical user interfaces (GUIs) in a spreadsheet without any dependency on web application development teams to create the GUI.

At block 202, the system such as client device 102 obtains web service metadata 108 from web service 104. In some implementations, client device 102 may contact web service 104 via a uniform resource locator (URL). In some implementations, the URL may be provided by a user. For example, a user may enter the URL in an application programming interface (API) URL.

In various implementations, client device 102 interrogates web service 104 to obtain web service metadata 108. In various implementations, web service metadata 108 provides a description of what services and resources (also referred to as business objects) that web service 104 provides. Sets of multiple resources or business objects may also be referred to as resource collections. For example, a resource collection may involve employee information (e.g., employee resource collection). For example, an employee resource collection may include employee information such as first name, last name, email, phone number, hire date, job title, salary, department, etc. While example implementations are described herein in the context of employee information, implementations described herein may apply to other types of resources collections such as sales information, inventory information, weather information, etc.

In some implementations, web service 104 may be a representational state transfer (REST) service. In various implementations, a REST or RESTful service provides interoperability between computer systems on the Internet. REST-compliant web services enable requesting systems such as client device 102 to access and manipulate textual representations of web resources using a uniform and predefined set of stateless operations. In various implementations, client device 102 sends a request to web service 104 requesting metadata 108, and web service 104 responds to client device 102 by sending metadata 108 to client device 102.

At block 204, the system determines one or more capabilities of web service 104 based on web service metadata 108. In various implementations, the system analyzes web service metadata 108 to determine one or more capabilities of web service 104. For example, web service 104 may provide different types of data or attributes for a spreadsheet. In another example, web service 104 may provide data to the spreadsheet (e.g., an empty table) at client device 102. In various implementations, attributes may be associated with an employee. Note that the terms "attribute," "resource attribute," "field," and "business object field" may be used interchangeably. In some implementations, attributes may include first name, last name, email address, etc. In various implementations, an attribute may have particular properties that govern the behavior in various implementations. For example, properties may include whether data in a field can be changed, whether data is mandatory, etc. It may also specify a certain data type for a field (e.g. date, datetime, number, boolean, string).

In some implementations, properties may include whether a user can insert new entries, update existing entries, whether particular data is read-only, etc. The terms "properties" and "resource properties" may be used interchangeably. In some implementations, an attribute such as employee identification (ID) may be created when a new record associated with an employee is created, and may be read-only when updating an existing employee. In some implementations, resource properties indicated in metadata may exist at the attribute (field) level and also at the resource collection level. For example, an employee resource collection may support (or not support) a delete operation that would allow an existing employee to be deleted from the web service.

As described in more detail herein, in various implementations, these capabilities govern the behavior of a table component and columns associated with the table component during run time.

In some implementations, client device 102 displays the capabilities to a user such as an administrator. As described in more detail herein, implementations may enable the user to make some modifications to the information. For example, as described in more detail herein, implementations may enable a user to add or remove columns, or enable a user to change the wording (label) of a (column) header, etc.

At block 206, the system configures a table component 110 in a spreadsheet 112 based on the one or more capabilities indicated in web service metadata 108. In some implementations, to configure table component 110 in spreadsheet 112, the system automatically configures table component 110 based on web service metadata 108. As indicated herein, in various implementations, web service metadata 108 indicates attributes and properties associated with the attributes. Table component 110 includes these attributes, properties that govern characteristics such as formatting, styling, etc., and table component 110 applies the attributes and properties to particular cells in a spreadsheet. Example implementations are described in more detail herein in connection with FIG. 3.

In some implementations, configuring table component 110 based on web service metadata 108 enables table component 110 to map attributes (e.g., first name, last name, email address, etc.) to columns of a spreadsheet when table component 110 is inserted into the spreadsheet.

Figure 3:
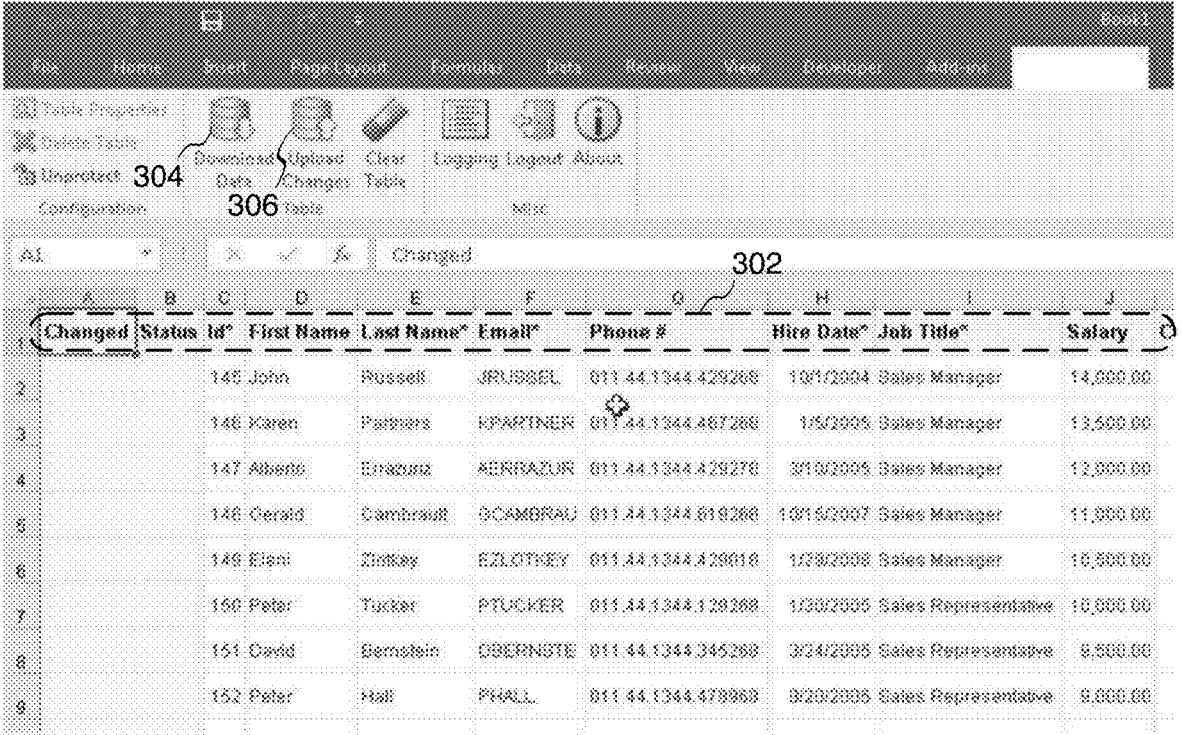
FIG. 3 illustrates an example spreadsheet, according to some implementations.

FIG. 3 illustrates example spreadsheet 112 of FIG. 1, according to some implementations. In various implementations, the system configures table component 110 to automatically render columns and fields, and to populate the cells associated with attributes (fields) with data in a particular format. For example, shown are table column headers 302, where each header indicates a particular type of information or attributes such as first name, last name, email, phone number, hire date, job title, salary, etc. During the configuration process, the table component 110 maps the attributes to particular columns, as well as apply formatting to specific fields in the columns of spreadsheet 112.

An example header shown is Phone #, which may be referred to as a display name (or label). The display name Phone # may correspond to a field name (identifier), PhoneNumber, provided by web service 104. In various implementations, table component 110 automatically renders a more readable display name (e.g., Phone #) rather than a potentially less readable field name (e.g., PhoneNumber). Also, shown is a symbol such as an asterisk (e.g., "*"), which indicates to the user that the data in the field is mandatory.

In some implementations, particular attributes may have read-only properties. For example, phone numbers may be read-only, which means the end user cannot change phone numbers and may only view them. In some implementations, table component 110 may visually indicate to the user that particular columns are read-only. For example, table component 110 may show fields in a particular column (e.g., the phone number column) in a different color or darker than other columns. In addition to formatting, implementations activate a spreadsheet's ability to prevent the user from altering the contents of certain cells. For example, each cell may have a "locked" property. In some implementations, a worksheet may be protected and locked cells cannot be edited. Some implementations may handle both the locked properties of cells and a protection mode of worksheets automatically based on web service metadata.

In various implementations, spreadsheet 112 may include a download data button 304 for downloading data from a particular source such as web service 104. In various implementations, table component 110 automatically applies attributes such as formatting, as well as functions to data when the data is downloaded to the spreadsheet. For example, the words in the header may be automatically rendered in a particular font and bolded in order to be distinguished from information under the headers. In various implementations, table component 110 determines what information is numbers, dates, strings, etc., and applies attributes accordingly. As described in more detail herein, table component 110 automatically applies formatting, including styles, based on web service metadata 108. Table component 110 also applies other properties of the columns in the table (e.g., whether the data in that column is editable, whether it is required or cannot be empty, etc.). As a result, an administrator user need not make changes to table component 110, and the business user need not make changes to the attributes of the presented information. In some implementations, the system may enable a user such as an administrator user to make some changes to the attributes of table component 110 (e.g., modifying a displayed header, etc.).

Referring still to FIG. 2, at block 208, the system tracks data changes in spreadsheet 112 based on user input. In some implementations, the user may pull data into spreadsheet 112 (e.g. by using a download data button 304) and then edit the data. For example, the user may add, delete, change or alter data, etc.

In various implementations, client device 102 sends a request to web service 104 requesting data, and web service 104 responds to client device 102 by sending the requested data to client device 102. In various implementations, data that is imported or populated into spreadsheet 112 may be sourced by various databases that supply data to different fields of spreadsheet 112. In various implementations, these databases may pass such data through web service 104 to client device 102.

At block 210, the system sends the data changes from spreadsheet 112 to web service 104. Referring still to FIG. 3, in some implementations, spreadsheet 112 may include an upload changes button 306 that accepts a user-provided input (e.g. button press) to initiate uploading the data changes from spreadsheet 112 to web service 104. As such, after a user makes changes to data in the spreadsheet, the user may select (e.g., click) upload changes button 306, which causes the system to send the data changes from spreadsheet 112 to web service 104, where spreadsheet 112 is bound to web service 104. In various implementations, web service 104 may then provide the data changes to a business application.

As a result, the system automatically integrates spreadsheet 112 with web service 104. In various implementations, spreadsheet 112 is an integrated spreadsheet that is integrated with (or bound to) web service 104, where spreadsheet 112 has a unique table component that maps attributes, fields, and associated properties with columns and cells of spreadsheet 112.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
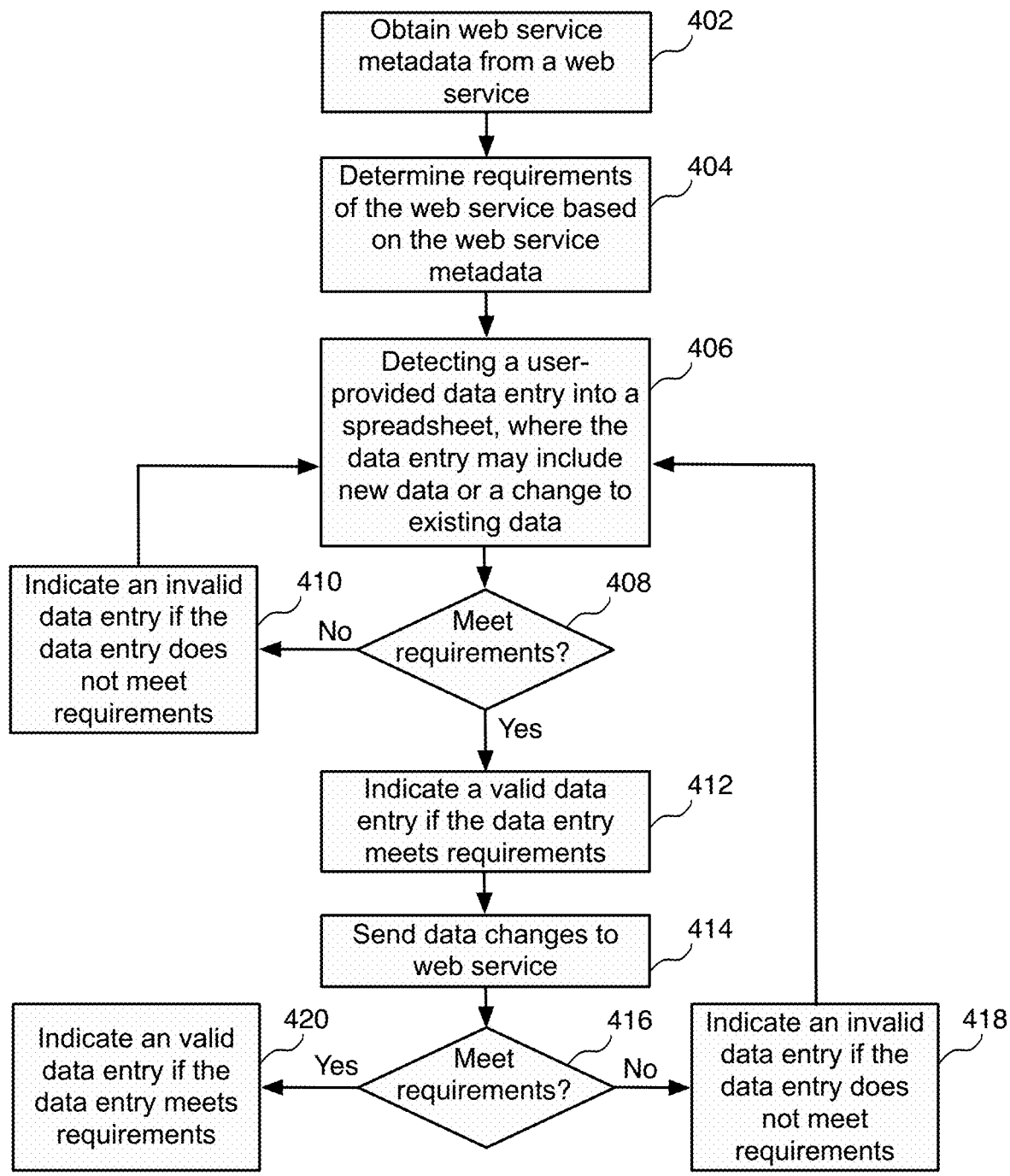
FIG. 4 illustrates an example flow diagram for validating spreadsheet entries and providing feedback on spreadsheet entries, according to some implementations.

FIG. 4 illustrates an example flow diagram for validating spreadsheet entries and providing feedback on spreadsheet entries, according to some implementations. As described in more detail herein, implementations provide a business user with prompt feedback on data entry errors so that corrections may be completed efficiently.

Referring to both FIGS. 1 and 4, at block 402, a system such as client device 102 obtains web service metadata 108 from web service 104. As indicated herein, in some implementations, client device 102 may contact web service 104 via a URL (e.g., entered by a user in an API URL, etc.), and interrogate web service 104 to obtain web service metadata 108. As indicated herein, in some implementations, web service 104 may be a representational state transfer (REST) service.

At block 404, the system determines one or more requirements of web service 104 based on web service metadata 108. In various implementations, the system analyzes web service metadata 108 to determine these requirements. Requirements may include, for example, whether a particular attribute or field is required (e.g., required to contain data), and/or whether a particular field requires a particular data type (e.g., text, number, date, etc.). As indicated herein, the terms attribute and field may be used interchangeably.

As indicated herein, in various implementations, attributes or fields may be associated with an employee. For example, attributes may include first name, last name, email address, etc. In various implementations, an attribute may have particular properties that govern the behavior of the attributes. For example, properties may include whether an attribute is required or optional, what data types are required for an attribute, etc.

As described in more detail herein, various implementations leverage such requirements to automatically provide a user such as a business user with interactive feedback during data entry. This capability is provided to the business user with no need for programming.

At block 406, the system detects a user-provided data entry into the spreadsheet, where the data entry may include new data or a change to existing data that the user provides. In various implementations, the data entry is provided by a user when the user enters data into cells of the spreadsheet. While some examples are described herein in the context of a single data entry, these implementations apply to multiple entries. For example, there may be hundreds or thousands of entries. In some scenarios, a user may alter spreadsheet cells one at a time. Or, a user may alter multiple cells in a single gesture. Examples may include "copy down" and "copy-paste" operations. Such operations may affect one cell, a few cells, or even hundreds of thousands of cells.

At block 408, the system determines if the data entry meets one or more of the requirements. As indicated herein, for example, some fields may be required, and other fields may be optional. For example, an employee identification, last name, email, etc. may be required. An example implementation involving a required field is described in more detail herein in connection with FIG. 5. In another example, each field may have a specific data type such as string, number, date, etc. An example implementation involving a required field is described in more detail herein in connection with FIG. 6.

At block 410, the system indicates an invalid data entry if the data entry does not meet one or more of the requirements. The following examples illustrate validation of data entries and feedback on invalid data entries.

Figure 5:
FIG. 5 illustrates an example portion of a spreadsheet 500, according to some implementations.

FIG. 5 illustrates example portion of a spreadsheet 500, according to some implementations. Shown are columns that are indicated by headers 502, where headers 502 provide labels for status, employee ID, first name, last name, and email fields. As indicated herein, some fields may be required, and other fields may be optional.

As shown, the last name field is mandatory, which is indicated by an asterisk symbol 504 (e.g., "*"). Other fields such as employee ID and email fields are required, as indicated by the asterisk symbols at each header associated with these fields. As shown, the first name field is optional.

As shown, a cell 506 associated with the last name field is empty, where the last name field is a required field according to the metadata. As such, cell 506 should not be empty. As a result, the system displays an invalid indication 508 (in the Status column), which indicates the row that has an invalid entry (absence of data). The system also displays invalid indication 510, which indicates the column (e.g., Last Name*) that has an invalid entry. Invalid indication 510 also indicates a reason for an invalid entry (e.g., "A value is required") and indicates a remedy for the invalid entry (e.g., "Enter a value."). In some implementations, the system may also immediately change the color of a cell border (e.g., red) in order to immediately indicate to the user an invalid entry. In some implementations, if the user selects a cell with invalid data, the system may display an invalid indication such as invalid indication 510. In some implementations, if a user corrects the problem indicated, the system removes all of the invalid indications.

Figure 6:
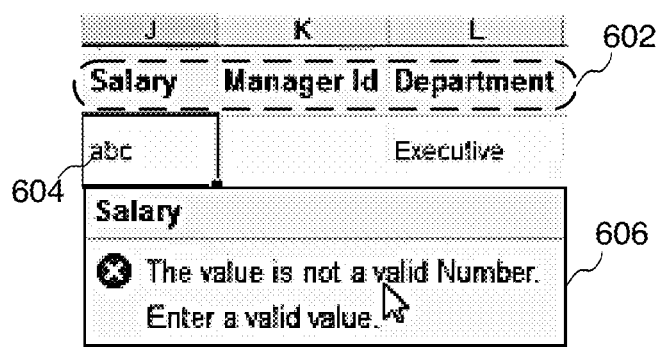
FIG. 6 illustrates example portion of a spreadsheet 600, according to some implementations.

FIG. 6 illustrates an example portion of a spreadsheet 600, according to some implementations. Shown are columns that are indicated by headers 602, where headers 602 provide labels for salary, manager ID, and department fields. In various implementations, each field may require a specific data type such as string, number, date, etc. In this example, the salary field requires a number, where this requirement is provided in the metadata determined in block 404.

As shown, non-numeric data 604 (e.g., "abc") has been entered in the cell associated with the salary field. As a result, the system displays an invalid indication 606, which indicate what field (e.g., "Salary") has an invalid entry. Invalid indication 606 also indicates the reason for the invalid entry (e.g., "The value is not a valid number"), and indicates a remedy for the invalid entry (e.g., "Enter a valid value."). In some implementations, the system may also immediately change the color and/or thickness of a cell (e.g., red, bolded, etc.) in order to immediately indicate to the user an invalid entry. In some implementations, if the user selects a cell with invalid data, the system may display an invalid indication such as invalid indication 606.

These examples describe implementations, where the system automatically and immediately validates data entries and immediately provides a user such as a business user with interactive feedback during data entry. These validations may be considered client-side validations in that the client device determines requirements based on the metadata early on before data is sent or uploaded to the web service.

In this example implementation, the validation occurs as the user enters data without an additional query to the web service. This reduces data entry errors by providing prompt feedback to the user.

In response to the indication of an invalid data entry, at block 410, the user may correct the invalid entry, where the system detects the correct data entry, at block 406. In various implementations, if and when the user corrects an invalid entry, the system may cause any invalid indication to disappear.

In some implementations, the system may determine that a data entry does not meet a particular requirement after data changes are submitted or posted to the web service.

At block 412, the system indicates a valid data entry if the data entry meets one or more of the requirements. In some implementations, indicating a successful entry may be optional, depending on the particular implementation. In some implementations, the system may indicate a valid data entry (e.g., "Valid Entry) in the status column. Also, in some implementations, such an indication of a valid entry may be displayed after a correction is made by the user to remedy an invalid entry.

At block 414, the system sends/uploads the data changes to web service 104. As described in more detail herein, the validation process at the client device may be referred to as a first level or first tier validation. In various implementations, business rules may be applied at the web service, where the web service imposes such business rules at the backend after receiving data changes. This subsequent validation at the web service may be referred to as a second level or second tier validation. The following example illustrates the subsequent validation.

Figure 7:
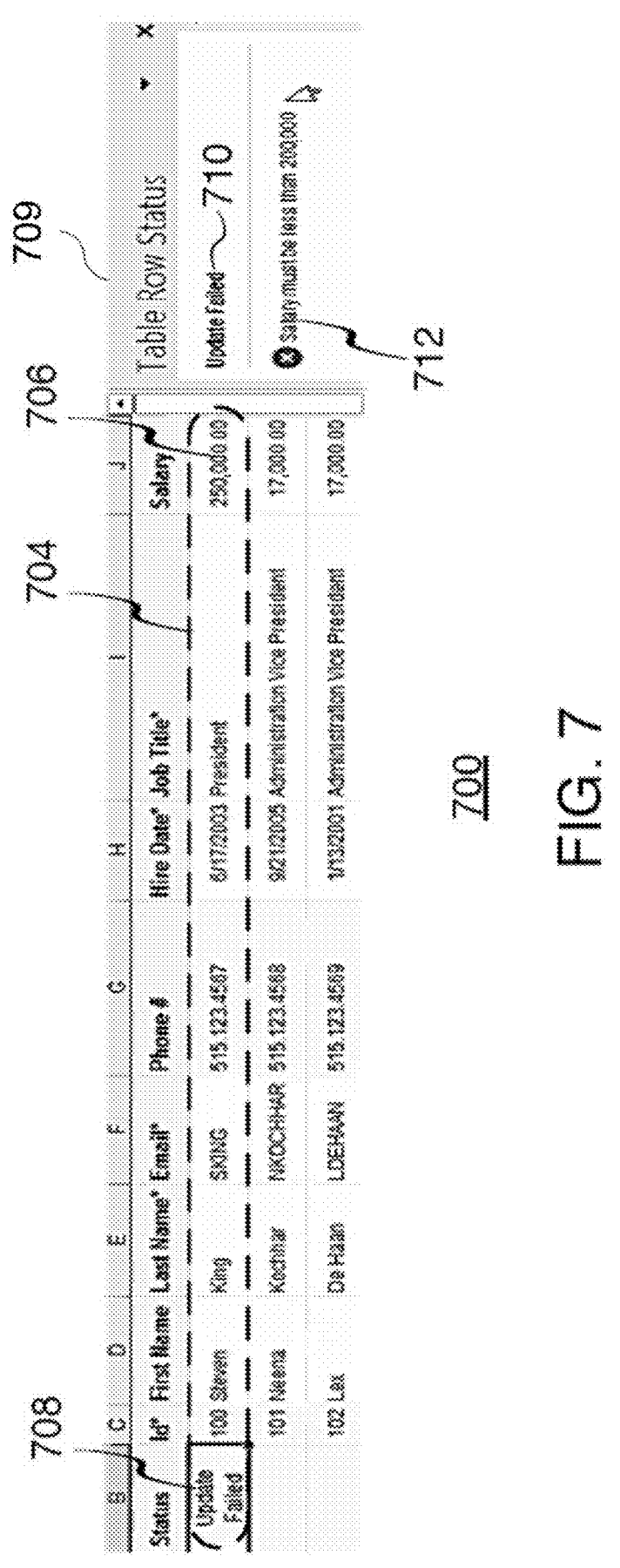

FIG. 7 illustrates example portion of a spreadsheet 700, according to some implementations. Shown is a record 704 that is associated with a particular employee. Also shown is a data entry 706 of $250,000.00 in a cell of the record, where the cell is associated with the salary field. In this particular example, the type of data is numeric, which is correct, as the salary field requires numeric data. This requirement is indicated by the metadata provided by the web service.

At block 416, the system determines if the data entry meets one or more of the requirements at the web service, based on information received from the web service. For example, the system determines whether the web service accepts or rejects the proposes changes. In the case of a rejection, the system processes the rejection messages to make them presentable to the business user. As indicated above, in various implementations, business rules may be applied at the web service, where the web service imposes such business rules at the backend after receiving data changes. In this example, data entry 706 was valid based on the metadata but invalid based on a business rule that is enforced at the web service. Such business rules may not be indicated in the metadata. For example, data entry 706 is $250,000.00, but the business rule requires that the salary be less than $200,000.00. As a result, the web service sends an error message back to the client device.

At block 418, in response to the error message from web service 104, the system indicates an invalid data entry if the data entry does not meet one or more requirements of web service 104. For example, referring still to FIG. 7, the system (client device) may display an invalid indicator 708 (in the Status column) indicating the row with the invalid data entry. In some embodiments, clicking on a row with an invalid data entry may display detailed validation messages about the invalid data entry in a status window 709, which shows a Table Row Status. In the Table Row Status window, the system displays an invalid indicator 710 that indicates that the update failed, and indicates a reason 712 for the invalid entry (e.g., "Salary must be less than 200,000"). In response to the indication of an invalid data entry, at block 418, the user may correct the invalid entry, where the system detects the correct data entry, at block 406.

This is one example business rule and other business rules are possible, depending on the context and particular implementation. In various implementations, the system may handle multiple different validation failure messages per uploaded row. As such, the status window 709 may display a list of problems to be corrected.

In various implementations, the system collects errors as received from the web service and then displays invalid indicators as invalid entries occur. Such validation failure messages are provided in a user-friendly fashion so that a business user may make necessary corrections quickly and easily.

Referring still to FIG. 4, at block 420, the system indicates a valid data entry if the data entry meets the requirements at the web service. In some implementations, indicating a successful entry may be optional, depending on the particular implementation. In some implementations, the system may indicate a valid data entry (e.g., "Valid Entry) in the status column. Also, in some implementations, such an indication of a valid entry may be displayed after a correction is made by the user to remedy an invalid entry.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations provide a business user with prompt feedback on data entry errors so that corrections may be completed efficiently. Implementations also reduce the net cost of such data entry tasks. Implementations also enable users with no previous programming experience to rapidly integrate spreadsheets with web applications in order to retrieve, analyze, and edit data. Implementations also enable users to create and use ad-hoc graphical user interfaces (GUIs) in a spreadsheet without any dependency on web application development teams to create the GUI.

Figure 8:
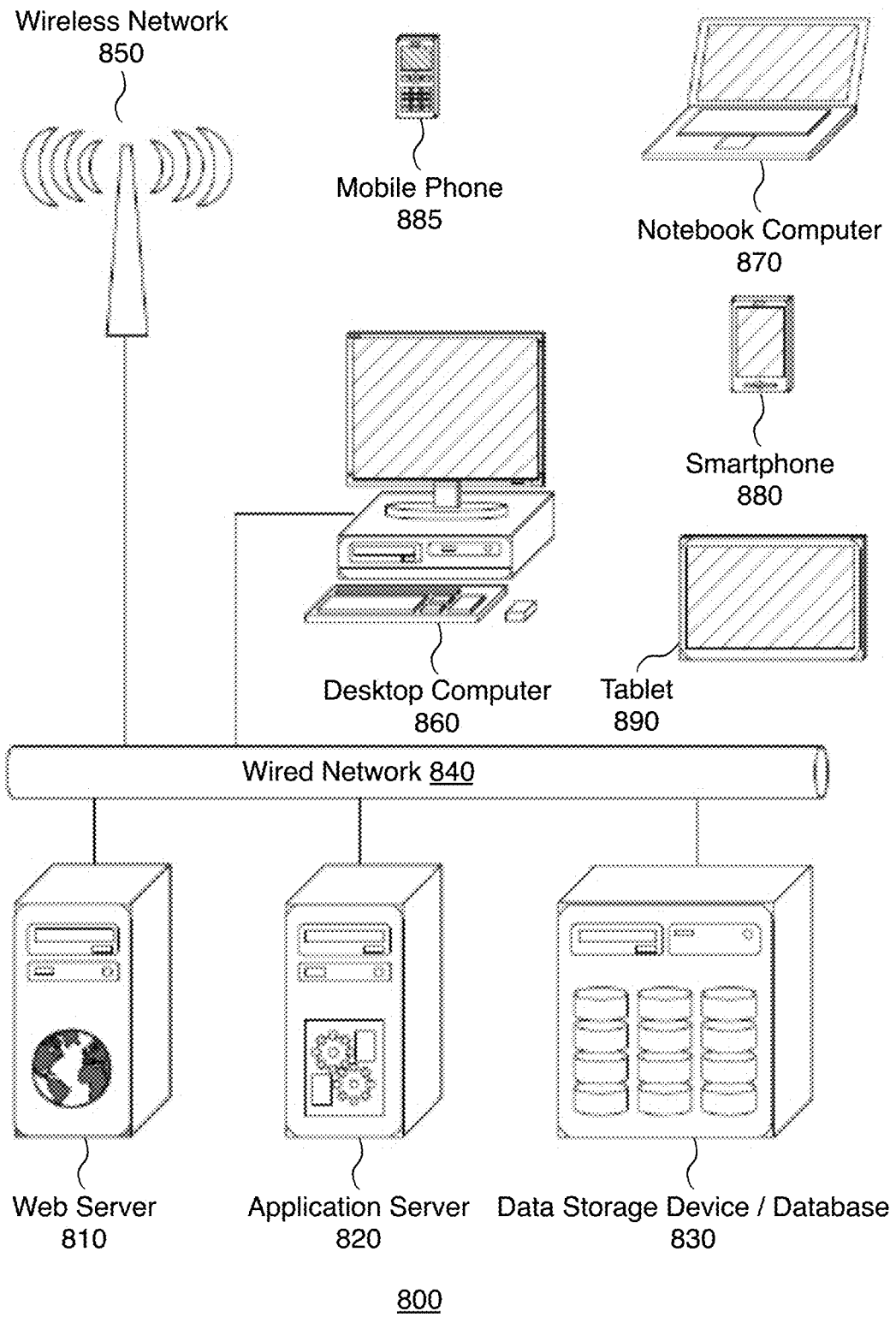
FIG. 8 illustrates a block diagram of an example system, which may be used for implementations described herein.

FIG. 8 illustrates a block diagram of an example system 800, which may be used for implementations described herein. Example system 800 is capable of supporting or running various hardware and/or software modules and associated methods discussed with reference to implementations described herein. Note that certain implementations may be implemented using one or more standalone applications (for example, residing in a user device) and/or one or more web-based applications implemented using a combination of client-side and server-side code. While system 800 performs implementations described herein, in other implementations, any suitable component or combination of components associated with system 800 or any suitable processor or processors associated with system 800 may facilitate performing the implementations described herein. In various implementations, system 800 may not have all of the components shown and/or may have other elements including other types of components instead of, or in addition to, those shown herein.

General system 800 includes user devices 860-890, including one or more desktop computers 860, one or more notebook computers 870, one or more smartphones 880, one or more mobile phones 885, and one or more tablets 890. General system 800 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 800 is shown with five user devices, any number of user devices can be supported.

A web server 810 is used to process requests from web browsers and standalone applications for web pages, electronic documents, enterprise data or other content, and other data from the user computers. Web server 810 may also provide push data or syndicated content, such as RSS feeds, of data related to enterprise operations.

An application server 820 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 820 are adapted to process input data and user computer requests and can store or retrieve data from data storage device or database 830. Database 830 stores data created and used by the data applications. In some implementations, database 830 includes a relational database that is adapted to store, update, and retrieve data in response to SQL format commands or other database query languages. Other implementations may use unstructured data storage architectures and Not Only SQL (NoSQL) databases.

In some implementations, application server 820 includes one or more general-purpose computers capable of executing programs or scripts. In some implementations, web server 810 is implemented as an application running on the one or more general-purpose computers. Web server 810 and application server 820 may be combined and executed on the same computers.

An electronic communication network 840-850 enables communication between user computers 860-890, web server 810, application server 820, and database 830. In some implementations, networks 840-850 may further include any form of electrical or optical communication devices, including wired network 840 and wireless network 850. Networks 840-850 may also incorporate one or more local-area networks, such as an Ethernet network, wide-area networks, such as the Internet; cellular carrier data networks; and virtual networks, such as a virtual private network.

System 800 is one example for executing applications according to some implementations. In some implementations, application server 810, web server 820, and optionally database 830 can be combined into a single server computer application and system. In further implementations, virtualization and virtual machine applications may be used to implement one or more of application server 810, web server 820, and database 830.

In still further implementations, all or a portion of the web and application serving functions may be integrated into an application running on each of the user computers. For example, a JavaScript application on the user computer may be used to retrieve or analyze data and display portions of the applications.

In various implementations, system 800 may not have all of the components shown and/or may have other elements including other types of components instead of, or in addition to, those shown herein.

Figure 9:
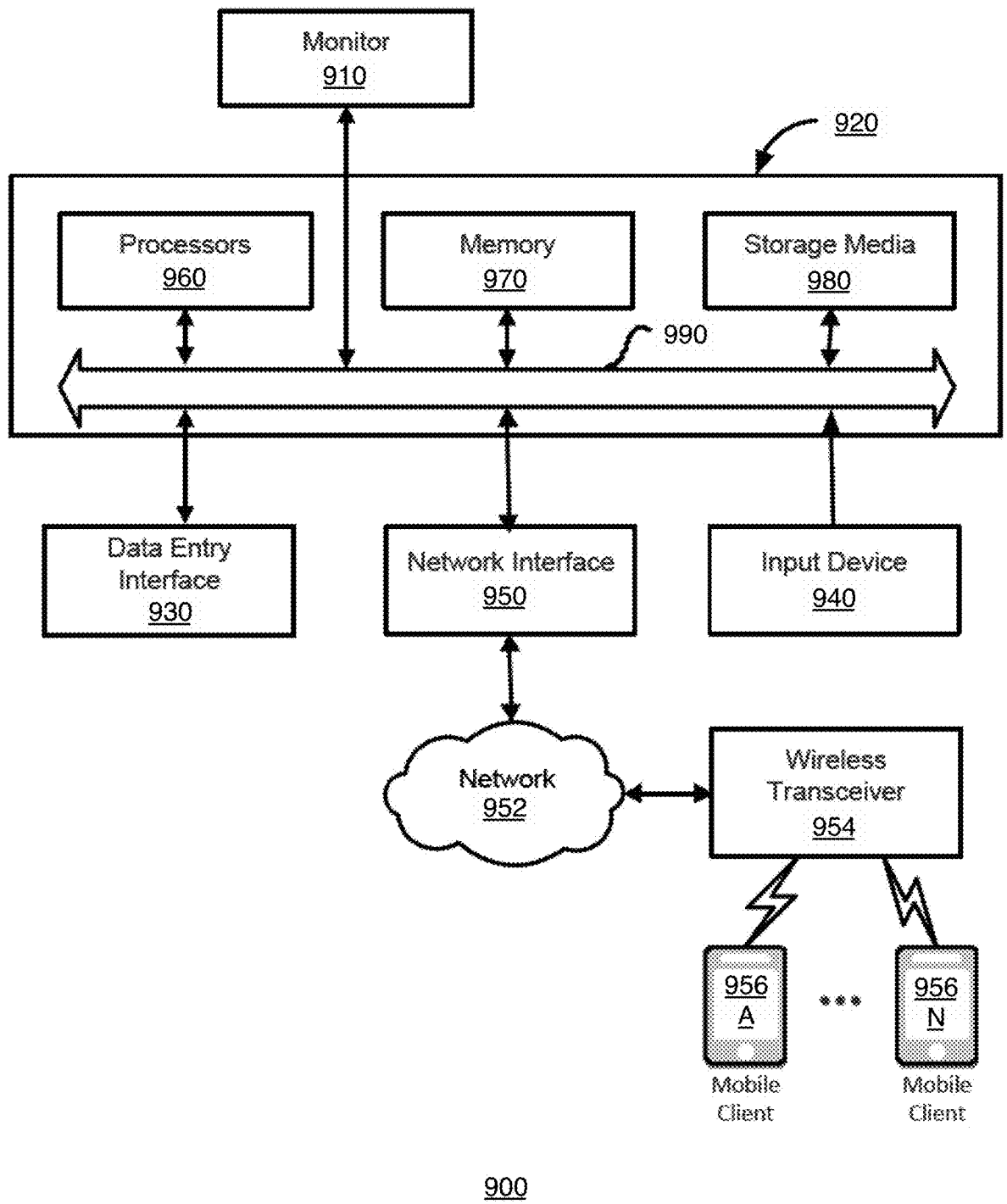
FIG. 9 illustrates a block diagram of an example network environment, which may be used for implementations described herein.

FIG. 9 illustrates a block diagram of an example network environment 900, which may be used for implementations described herein. Network environment 900 is merely illustrative and not intended to limit the scope of the claims. One of ordinary skill in the art would recognize other variations, modifications, and alternatives. For example, network environment 900 may be implemented in a distributed client-server configuration having one or more client devices in communication with one or more server systems.

In one exemplary implementation, network environment 900 includes a display device such as a monitor 910, a computer 920, a data entry interface 930 such as a keyboard, touch device, and the like, an input device 940, a network interface 950, and the like. Input device 940 is typically implemented as a computer mouse, a trackball, a track pad, wireless remote, tablet, touch screen, and the like. Moreover, input device 940 typically allows a user to select and operate objects, icons, text, characters, and the like that appear, for example, on the monitor 910.

Network interface 950 may include an Ethernet card, a modem (telephone, satellite, cable, integrated services digital network (ISDN), etc.), an asynchronous digital subscriber line (DSL) unit, and the like. Furthermore, network interface 950 may be physically integrated on the motherboard of computer 920, may be a software program, such as soft DSL, or the like.

Network environment 900 may also include software that enables communications over communication network 952 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 952 may include a local area network, a wide area network, a wireless network, an Intranet, the Internet, a private network, a public network, a switched network, or any other suitable communication network, such as for example cloud networks. Communication network 952 may include many interconnected computer systems and any suitable communication links such as hardwire links, optical links, satellite or other wireless communications links such as Bluetooth, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 may include familiar computer components such as one or more processors 960, and memory storage devices, such as a memory 970, e.g., random access memory (RAM), storage media 980, and system bus 990 interconnecting the above components. In one embodiment, computer 920 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 920 performs implementations described herein, in other implementations, any suitable component or combination of components associated with computer 920 or any suitable processor or processors associated with computer 920 may facilitate performing the implementations described herein. In various implementations, computer 900 may not have all of the components shown and/or may have other elements including other types of components instead of, or in addition to, those shown herein.

Memory 970 and Storage media 980 are examples of non-transitory tangible media for storage of data, audio/video files, computer programs or program instructions, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore, various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for validating a user-provided data entry to a spreadsheet at a client device with web service metadata, the method comprising:
    making a request, by the client device, for web service metadata from a web service, wherein data for the spreadsheet is populated from the web service;
    determining one or more requirements of the web service based on the web service metadata;
    receiving the user-provided data entry into the spreadsheet for upload to the web service, wherein the user-provided data entry is a data change of the populated data from the web service;
    first tier validating of the data change, by the client device, if the user-provided data entry meets the one or more requirements of the web service metadata;
    second tier backend validating of the data change, using the web service, if the user-provided data entry meets one or more web service rules that are not also specified by the web services metadata; and
    indicating an invalid data entry on the spreadsheet if the data change fails to meet one or more of: the one or more requirements of the web service metadata or the one or more web service rules.

2. The method of claim 1, wherein the one or more requirements of the web service metadata include one or more properties for attributes and the one or more web service rules include one or more business rules for the data.

3. The method of claim 1, wherein the data from the web service includes headers in the spreadsheet and the user-provided data entry includes data under the headers.

4. The method of claim 1, wherein the data from the web service includes data under headers in the spreadsheet and the user-provided data entry includes changes to the data under the headers.

5. The method of claim 1, wherein the user-provided data entry is determined to be valid based on the one or more requirements of the web service metadata in the first tier validating but invalid based on a one or more web service rules in the second tier backend validating.

6. The method of claim 1, wherein indicating an invalid data entry includes displaying a list of two or more of: the one or more requirements of the web service metadata or the one or more web service rules, to be corrected.

7. The method of claim 1, wherein the second tier backend validating is initiated by a user-provided input.

8. A non-transitory computer-readable storage medium carrying program instructions thereon for validating a user-provided data entry to a spreadsheet at a client device with web service metadata, the instructions when executed by one or more processors cause the one or more processors to perform operations comprising:
    making a request, by the client device, for web service metadata from a web service, wherein data for the spreadsheet is populated from the web service;
    determining one or more requirements of the web service based on the web service metadata;
    receiving the user-provided data entry into the spreadsheet for upload to the web service, wherein the user-provided data entry is a data change of the populated data from the web service;
    first tier validating of the data change, by the client device, if the user-provided data entry meets the one or more requirements of the web service metadata;
    second tier backend validating of the data change, using the web service, if the user-provided data entry meets one or more web service rules that are not also specified by the web services metadata; and
    indicating an invalid data entry on the spreadsheet if the data change fails to meet one or more of: the one or more requirements of the web service metadata or the one or more web service rules.

9. The non-transitory computer-readable storage medium of claim 8, wherein the one or more requirements of the web service metadata include one or more properties for attributes and the one or more web service rules include one or more business rules for the data.

10. The non-transitory computer-readable storage medium of claim 8, wherein the data from the web service includes headers in the spreadsheet and the user-provided data entry includes data under the headers.

11. The non-transitory computer-readable storage medium of claim 8, wherein the data from the web service includes data under headers in the spreadsheet and the user-provided data entry includes changes to the data under the headers.

12. The non-transitory computer-readable storage medium of claim 8, wherein the user-provided data entry is determined to be valid based on the one or more requirements of the web service metadata in the first tier validating but invalid based on a one or more web service rules in the second tier backend validating.

13. The non-transitory computer-readable storage medium of claim 8, wherein indicating an invalid data entry includes displaying a list of two or more of: the one or more requirements of the web service metadata or the one or more web service rules, to be corrected.

14. The non-transitory computer-readable storage medium of claim 8, wherein the second tier backend validating is initiated by a user-provided input.

15. An apparatus comprising:
    one or more processors; and
    logic encoded in one or more non-transitory computer-readable storage media for execution by the one or more processors for validating a user-provided data entry to a spreadsheet at a client device with web service metadata, and when executed operable to perform operations comprising:
    making a request, by the client device, for web service metadata from a web service, wherein data for the spreadsheet is populated from the web service;
    determining one or more requirements of the web service based on the web service metadata;
    receiving the user-provided data entry into the spreadsheet for upload to the web service, wherein the user-provided data entry is a data change of the populated data from the web service;
    first tier validating of the data change, by the client device, if the user-provided data entry meets the one or more requirements of the web service metadata;
    second tier backend validating of the data change, using the web service, if the user-provided data entry meets one or more web service rules that are not also specified by the web services metadata; and
    indicating an invalid data entry on the spreadsheet if the data change fails to meet one or more of: the one or more requirements of the web service metadata or the one or more web service rules.

16. The apparatus of claim 15, wherein the one or more requirements of the web service metadata include one or more properties for attributes and the one or more web service rules include one or more business rules for the data.

17. The apparatus of claim 15, wherein the data from the web service includes data under headers in the spreadsheet and the user-provided data entry includes changes to the data under the headers.

18. The apparatus of claim 15, wherein the user-provided data entry is determined to be valid based on the one or more requirements of the web service metadata in the first tier validating but invalid based on a one or more web service rules in the second tier backend validating.

19. The apparatus of claim 15, wherein indicating an invalid data entry includes displaying a list of two or more of: the one or more requirements of the web service metadata or the one or more web service rules, to be corrected.

20. The apparatus of claim 15, wherein the second tier backend validating is initiated by a user-provided input.

\* \* \* \* \*